US012635762B1

(12) United States Patent
Zhu

(10) Patent No.: US 12,635,762 B1
(45) Date of Patent: May 26, 2026

(54) METAL SUPPORT PLATE FOR FOOTWEAR, SOLE, SHOE AND MANUFACTURING PROCESS FOR SOLE

(71) Applicant: CAS VALUE (FUJIAN) TECHNOLOGY CO., LTD., Quanzhou (CN)

(72) Inventor: Yaosheng Zhu, Quanzhou (CN)

(73) Assignee: CAS VALUE (FUJIAN) TECHNOLOGY CO., LTD., Quanzhou (CN)

( * ) Notice: Subject to any disclaimer, the term of this patent is extended or adjusted under 35 U.S.C. 154(b) by 0 days.

(21) Appl. No.: 19/234,458

(22) Filed: Jun. 11, 2025

Related U.S. Application Data

(63) Continuation of application No. PCT/CN2025/091376, filed on Apr. 26, 2025.

(30) Foreign Application Priority Data

| | | |
|---|---|---|
| Feb. 6, 2025 | (CN) .......................... | 202520187314.0 |
| Feb. 6, 2025 | (CN) .......................... | 202520187325.9 |

(Continued)

(51) Int. Cl.
*A43B 13/18* (2006.01)
*A43B 13/10* (2006.01)
(Continued)

(52) U.S. Cl.
CPC .......... *A43B 13/10* (2013.01); *B29D 35/0009* (2013.01); *B29D 35/142* (2013.01); *B29K 2705/00* (2013.01)

(58) Field of Classification Search
None
See application file for complete search history.

(56) References Cited

U.S. PATENT DOCUMENTS

| | | | | |
|---|---|---|---|---|
| 4,258,449 A | * | 3/1981 | Bradley ................. | A43B 23/22 |
| | | | | 12/146 S |
| 6,321,469 B1 | * | 11/2001 | Cretinon ................ | A43B 13/12 |
| | | | | 36/102 |

(Continued)

FOREIGN PATENT DOCUMENTS

| | | |
|---|---|---|
| CN | 209452932 U | 10/2019 |
| CN | 113652078 A | 11/2021 |

(Continued)

OTHER PUBLICATIONS

First Office Action received in corresponding Chinese patent application No. 202510341487.8, dated Apr. 26, 2025, 12 pages.

(Continued)

*Primary Examiner* — Jila M Mohandesi
(74) *Attorney, Agent, or Firm* — Cooper Legal Group, LLC

(57) ABSTRACT

The present application relates to a metal support plate for footwear, a sole, a shoe and a manufacturing process for the sole, wherein the main technical solution involves a metal support plate for footwear, including a support plate, wherein the support plate is manufactured from a lightweight metal material with a density of less than 5 g/cm$^3$, and the support plate is provided with hollowed mesh holes occupying 50% to 90% of total area of the support plate.

8 Claims, 12 Drawing Sheets

(30) Foreign Application Priority Data

| | | | |
|---|---|---|---|
| Mar. 18, 2025 | (CN) | ......................... | 202520477281.3 |
| Mar. 21, 2025 | (CN) | ......................... | 202510341487.8 |
| Mar. 21, 2025 | (CN) | ......................... | 202510341489.7 |

(51) Int. Cl.

| | |
|---|---|
| A43B 13/12 | (2006.01) |
| A43B 13/14 | (2006.01) |
| A43B 21/26 | (2006.01) |
| A43B 21/32 | (2006.01) |
| B29D 35/00 | (2010.01) |
| B29D 35/14 | (2010.01) |
| B29K 705/00 | (2006.01) |

(56) References Cited

U.S. PATENT DOCUMENTS

| | | | | |
|---|---|---|---|---|
| 7,082,702 | B2 * | 8/2006 | Cretinon | A43B 13/026 |
| | | | | 36/76 R |
| 8,365,440 | B2 * | 2/2013 | Rivas | A43B 7/18 |
| | | | | 36/107 |
| 9,351,533 | B2 * | 5/2016 | Blevens | A43B 21/32 |
| 9,462,845 | B2 * | 10/2016 | Auger | A43D 29/00 |
| 9,820,529 | B2 * | 11/2017 | Droege | A43B 13/12 |
| 10,016,013 | B2 * | 7/2018 | Kormann | A43B 5/14 |
| 10,897,961 | B2 * | 1/2021 | Baucom | A43B 13/223 |
| 11,407,200 | B2 * | 8/2022 | Khan | B32B 5/024 |
| 12,082,646 | B2 * | 9/2024 | Coonrod | A43B 13/186 |
| 2013/0139412 | A1 * | 6/2013 | Auger | A43B 13/184 |
| | | | | 36/25 R |
| 2014/0109441 | A1 | 4/2014 | McDowell et al. | |
| 2014/0250723 | A1 | 9/2014 | Kohatsu | |
| 2016/0051009 | A1 * | 2/2016 | Kormann | A43B 1/08 |
| | | | | 36/103 |
| 2023/0284739 | A1 | 9/2023 | Hillyer et al. | |

FOREIGN PATENT DOCUMENTS

| | | | |
|---|---|---|---|
| CN | 114589876 | A | 6/2022 |
| CN | 114986774 | A | 9/2022 |
| CN | 217407962 | U | 9/2022 |
| CN | 221059726 | U | 6/2024 |
| CN | 118650802 | A | 9/2024 |
| CN | 221660163 | U | 9/2024 |
| CN | 221785482 | U | 10/2024 |
| CN | 118900647 | A | 11/2024 |
| CN | 118927522 | A | 11/2024 |
| CN | 119116256 | A | 12/2024 |
| CN | 119840085 | A | 4/2025 |
| EP | 0614623 | A1 | 9/1994 |
| GB | 191114436 | A | 8/1911 |
| JP | H0686515 | U | 12/1994 |
| JP | H0686527 | U | 12/1994 |
| JP | H09314588 | A | 12/1997 |
| JP | 2002021015 | A | 1/2002 |
| JP | 2016043271 | A | 4/2016 |
| JP | 2018519056 | A | 7/2018 |
| KR | 20130087344 | A | 8/2013 |
| WO | 2008011366 | A2 | 1/2008 |

OTHER PUBLICATIONS

First Office Action received in corresponding Chinese patent application No. 202510341489.7, dated May 8, 2025, 15 pages.

Office Action received in corresponding Chinese patent application No. 202520187314.0, dated Nov. 13, 2025, 4 pages.

International Search Report received in corresponding International patent application No. PCT/CN2025/091376, mailed Oct. 24, 2025, 18 pages.

Non-Final Office Action received in corresponding U.S. Appl. No. 19/379,938, dated Mar. 25, 2026, 22 pages.

First Office Action received in corresponding Japanese patent application No. 2026-003141, dated Feb. 19, 2026, 8 pages.

* cited by examiner

A

METAL SUPPORT PLATE FOR FOOTWEAR, SOLE, SHOE AND MANUFACTURING PROCESS FOR SOLE

CROSS-REFERENCE TO RELATED APPLICATION

This application is a continuation of PCT application serial no. PCT/CN2025/091376, filed on Apr. 26, 2025, which claims the priority and benefit of Chinese patent application serial no. 202520477281.3, filed on Mar. 18, 2025, Chinese patent application serial no. 202510341487.8, filed on Mar. 21, 2025, Chinese patent application serial no. 202520187325.9, filed on Feb. 6, 2025, Chinese patent application serial no. 202520187314.0, filed on Feb. 6, 2025, and Chinese patent application serial no. 202510341489.7, filed on Mar. 21, 2025. The entireties of PCT application serial no. PCT/CN2025/091376, Chinese patent application serial no. 202520477281.3, Chinese patent application serial no. 202510341487.8, Chinese patent application serial no. 202520187325.9, Chinese patent application serial no. 202520187314.0, and Chinese patent application serial no. 202510341489.7 are hereby incorporated by reference herein and made a part of this specification.

TECHNICAL FIELD

The present application relates to a field of footwear components, and more particularly, to a metal support plate for footwear, a sole, a shoe and a manufacturing process for the sole.

BACKGROUND ART

The design and development of footwear products have been receiving widespread attention, especially regarding the integration of functionality and comfort. Functional components are often incorporated into the footwear, such as embedded carbon fiber plates (also known as carbon plates) inside the sole. The design of carbon plate footwear helps to provide better rebound and acceleration capabilities, enabling runners to conserve energy during running, and thus improving running efficiency. Alternatively, rigid plastic or carbon fiber may be used as supportive components for the upper to support the upper shape or provide foot support and protection.

The above-mentioned functional components are often manufactured from carbon fiber material, mainly because carbon fiber has the advantages of lightweight and high strength, and can meet the performance requirements of footwear applications.

However, the manufacturing process for carbon plates involves a series of processes including fiber pretreatment, impregnation molding, curing, post-molding processing, mold fabrication, cutting and dipping, high-temperature curing molding and post-processing. The processing process is complicated and time-consuming, and the complicated processing conditions also tend to lead to poor stability of the molding quality of carbon plates.

SUMMARY

In order to solve the problems of complicated manufacturing process and low stability of molding quality of the existing footwear components, the present application provides a metal support plate for footwear, a sole, a shoe and a manufacturing process for the sole.

In a first aspect, the present application provides a metal support plate for footwear, which adopts the following technical solution.

The metal support plate for the footwear includes a support plate, wherein the support plate is manufactured from a lightweight metal material with a density of less than 5 $g/cm^3$, and the support plate is provided with hollowed mesh holes occupying 50% to 90% of total area of the support plate.

Optionally, the support plate is integrally molded by a 3D printing process.

Optionally, a surface of the support plate is covered with a TPU film.

Optionally, a surface of the support plate is convexly configured with reinforcing ribs, at least one of the reinforcing ribs extends along a longitudinal direction of the support plate.

In a second aspect, the present application provides a sole, which adopts the following technical solution.

The sole includes a sole body and a metal support plate for footwear.

Optionally, the support plate is located between a midsole of the sole body and an outsole of the sole body or above the midsole of the sole body.

In a third aspect, the present application provides a shoe, which adopts the following technical solution.

The shoe includes a sole and an upper.

Optionally, the support plate is located between a midsole of the sole body and an outsole of the sole body or above the midsole of the sole body.

Optionally, the support plate is provided at a toe of the upper and/or at a heel of the upper.

In a fourth aspect, the present application provides a manufacturing process for the sole, which adopts the following technical solution.

The manufacturing process for the sole includes an integrally molding process or a bonding process; in the integrally molding process, the support plate is placed into an injection mold, a sole feed liquid is injected into the injection mold, and the sole feed liquid is bonded in contact with the support plate so as to mold the sole; in the bonding process, the support plate is adhesively bonded between the midsole of the sole body and the outsole of the sole body or above the midsole of the sole body by an adhesive coating method.

In summary, the present application has the following beneficial effects.

The support plate, manufactured from a lightweight metal material and having hollowed mesh holes, exhibits advantages of reduced weight, high strength and high rigidity, thereby serving as a viable substitute for conventional existing carbon fiber components; also, the molding process of the support plate of the present application is simple compared to the carbon fiber components, thereby improving the stability of the molding quality of the support plate 1.

3

Figure 5:
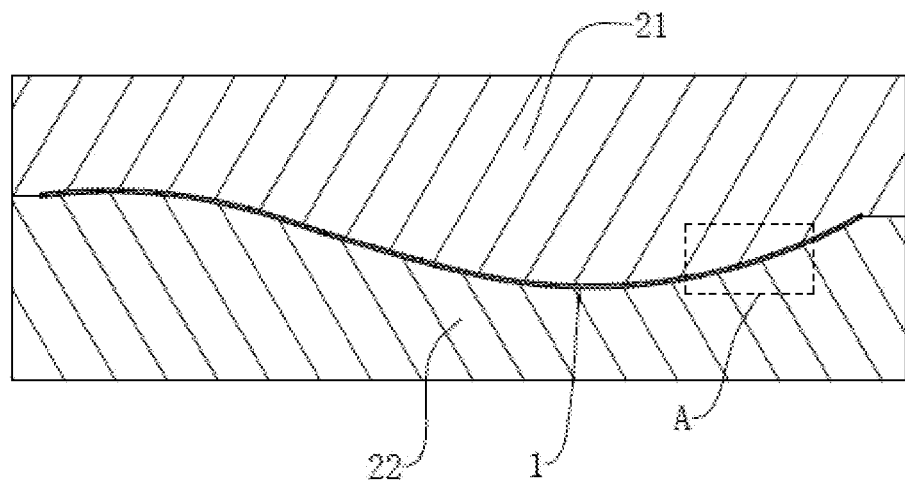

FIG. 5 is a cross-sectional view of the molding mold in a mold closed state according to Example 2.

Figure 6:
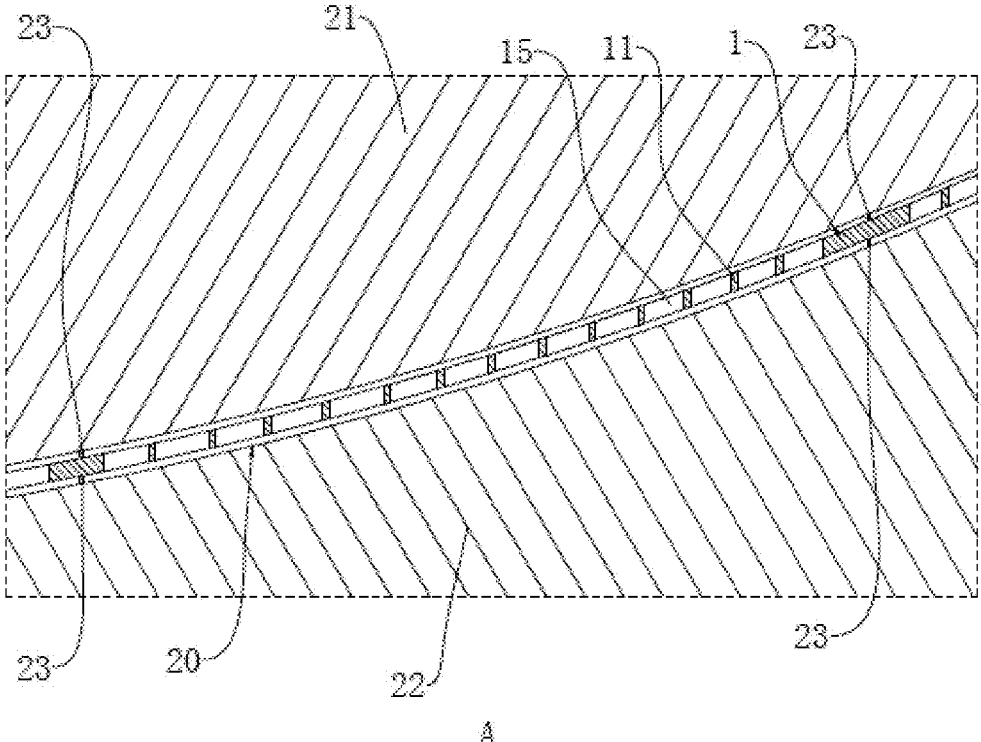
Figure 7:
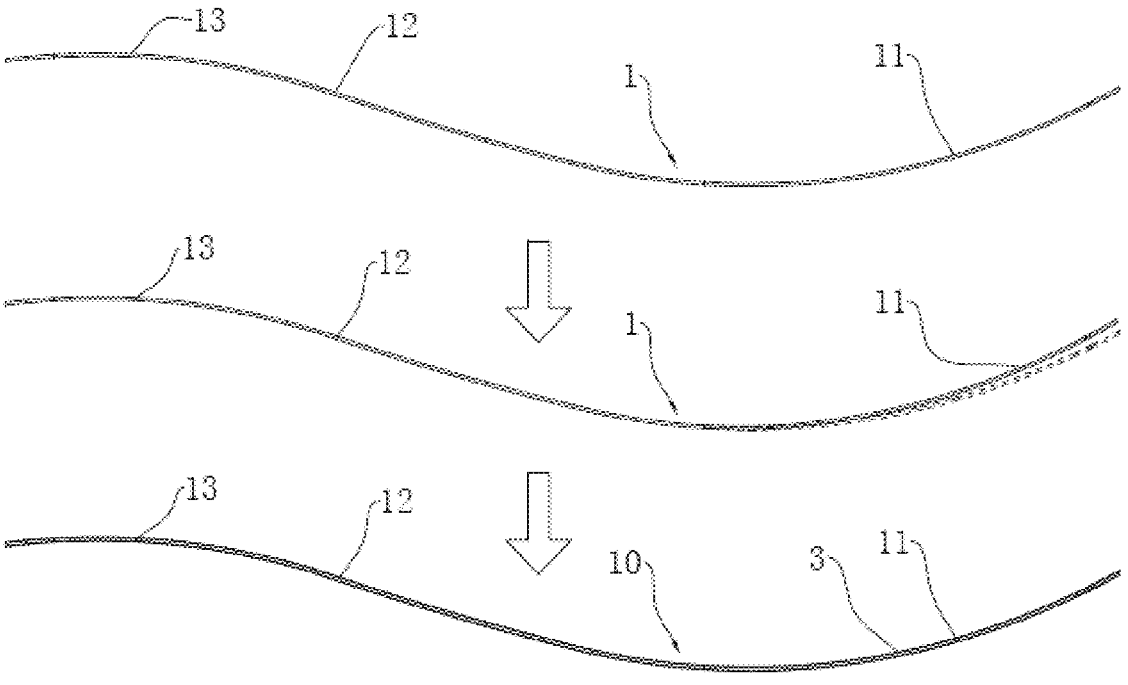

FIG. 6 is a partially enlarged view of part A in FIG. 5;

FIG. 7 is a process diagram for showing three state changes of the support plate according to Example 3.

Figure 8:
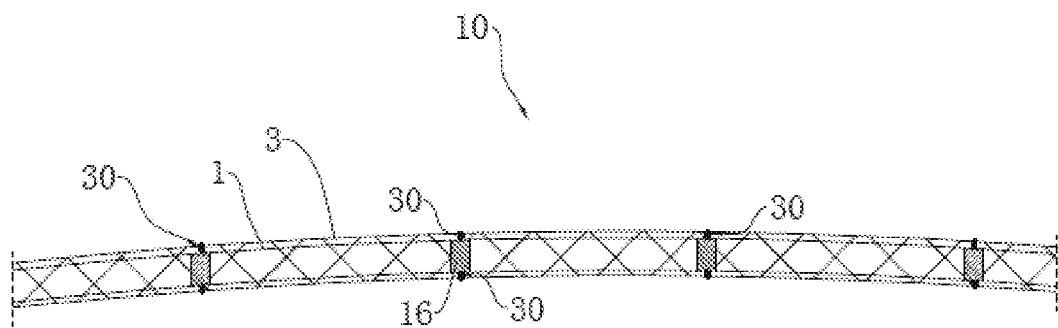

FIG. 8 is a partial cross-sectional view of the composite support plate according to Example 4.

Figure 9:
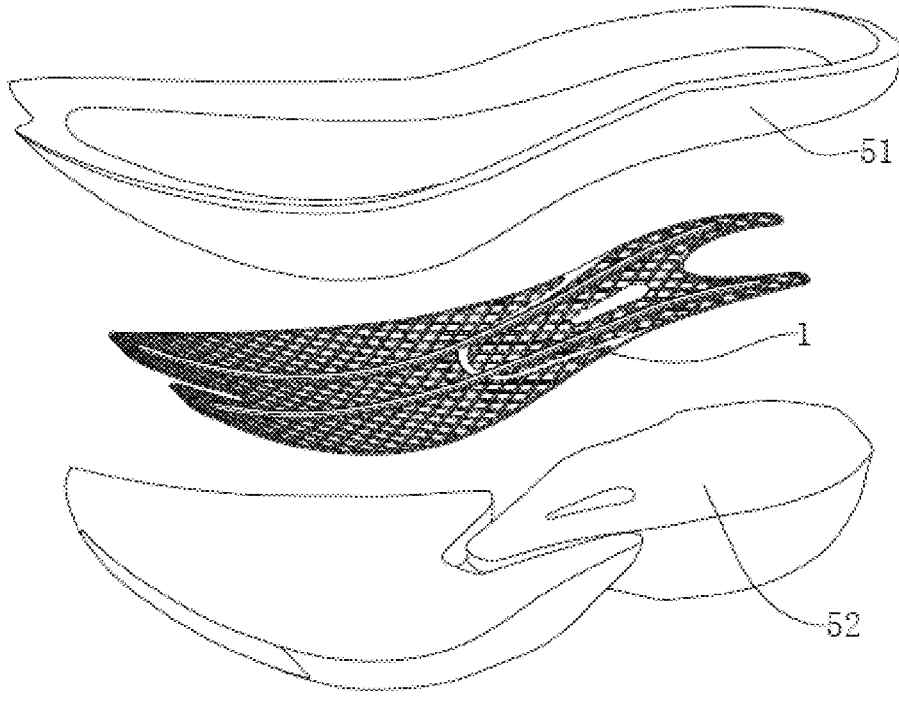

FIG. 9 is a schematic view of a sole according to Example 5.

Figure 10:
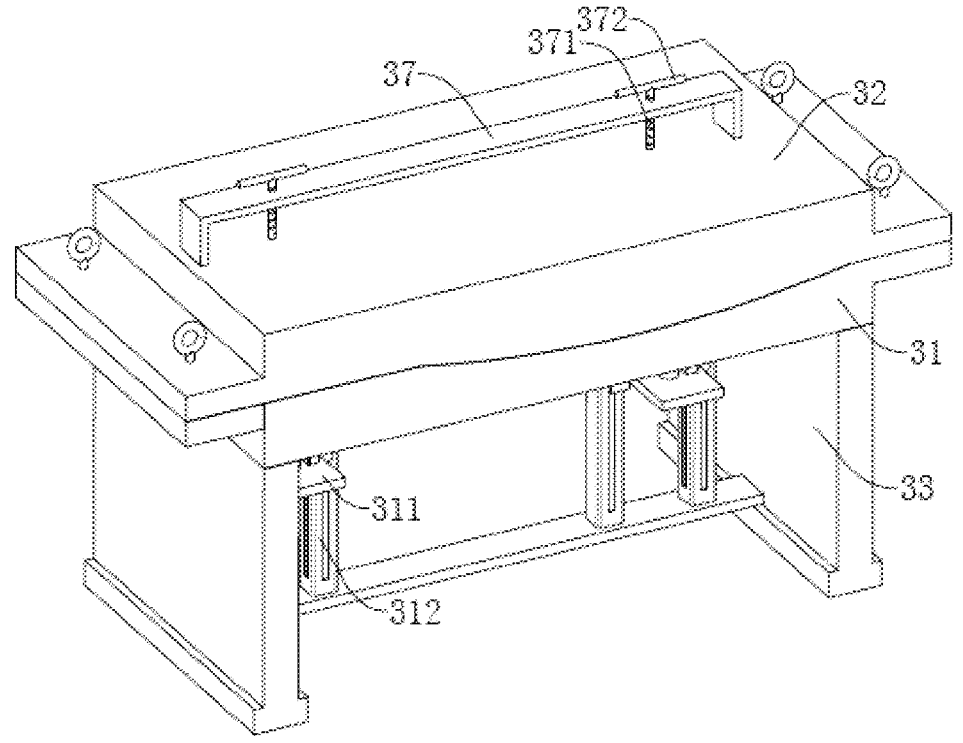

FIG. 10 is a schematic view of an injection mold according to Example 8.

Figure 11:
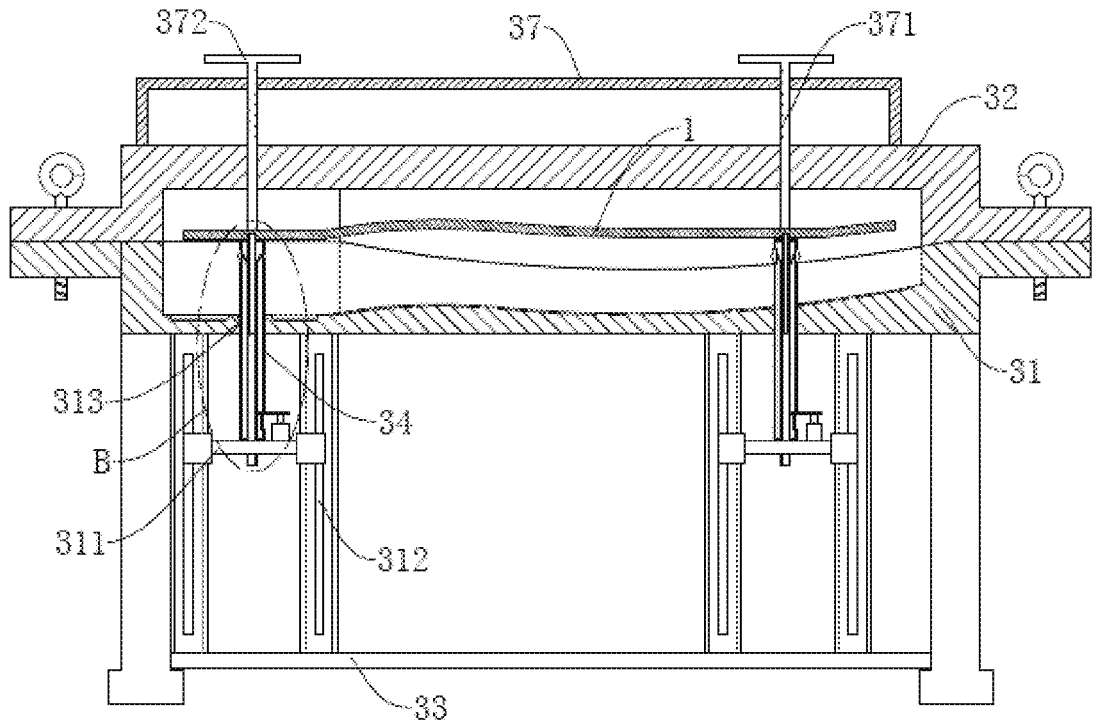

FIG. 11 is a cross-sectional view of the injection mold according to Example 8.

Figure 12:
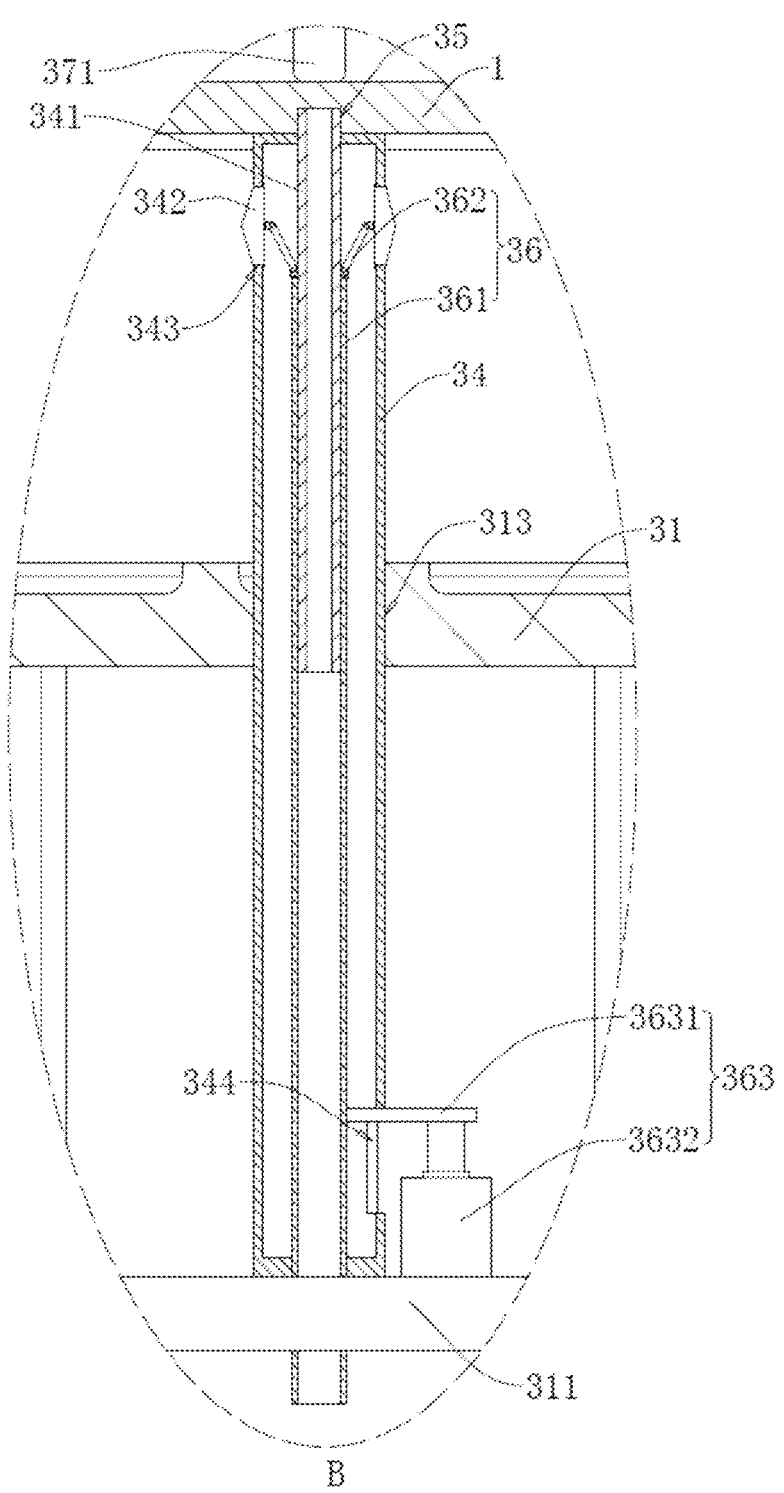

FIG. 12 is a partially enlarged view of part B in FIG. 11.

Figure 13:
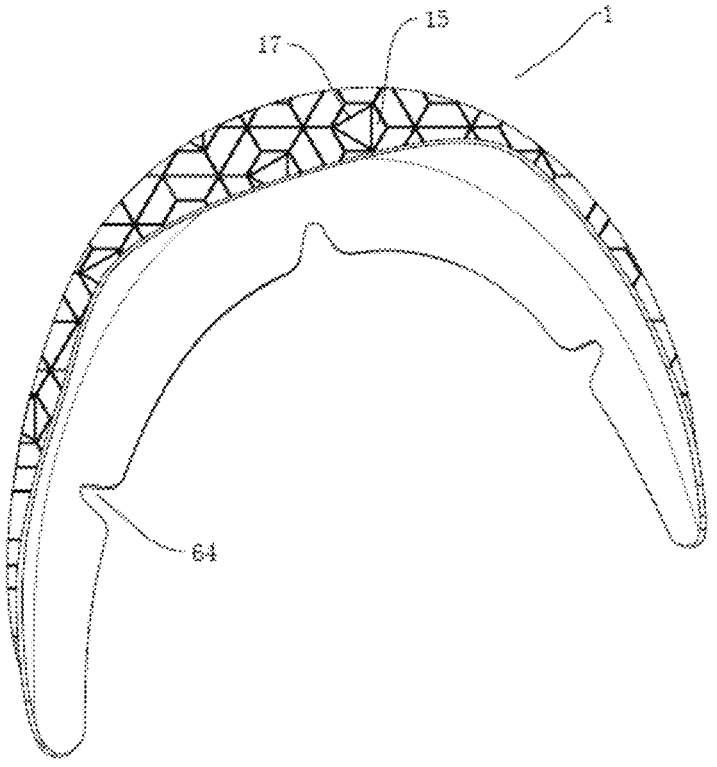

FIG. 13 is a schematic view of a support plate at a toe of an upper according to Example 10.

Figure 14:
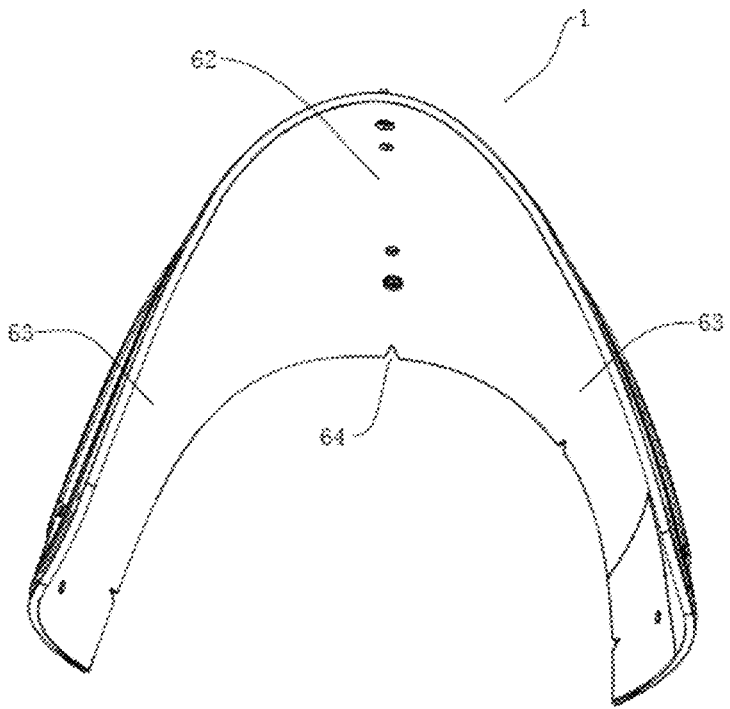

FIG. 14 is a schematic view of a support plate at a heel of the upper according to Example 10.

Figure 15:
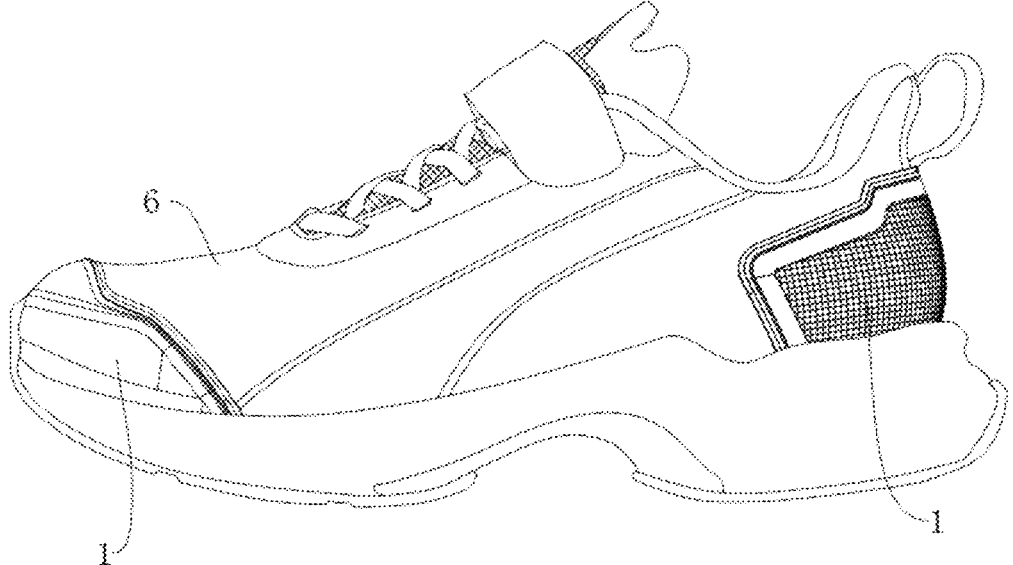

FIG. 15 is a schematic view of a shoe according to Example 10.

DETAILED DESCRIPTION

The present application will be described in further detail below with reference to FIGS. 1 to 15.

Example 1

Figure 1:
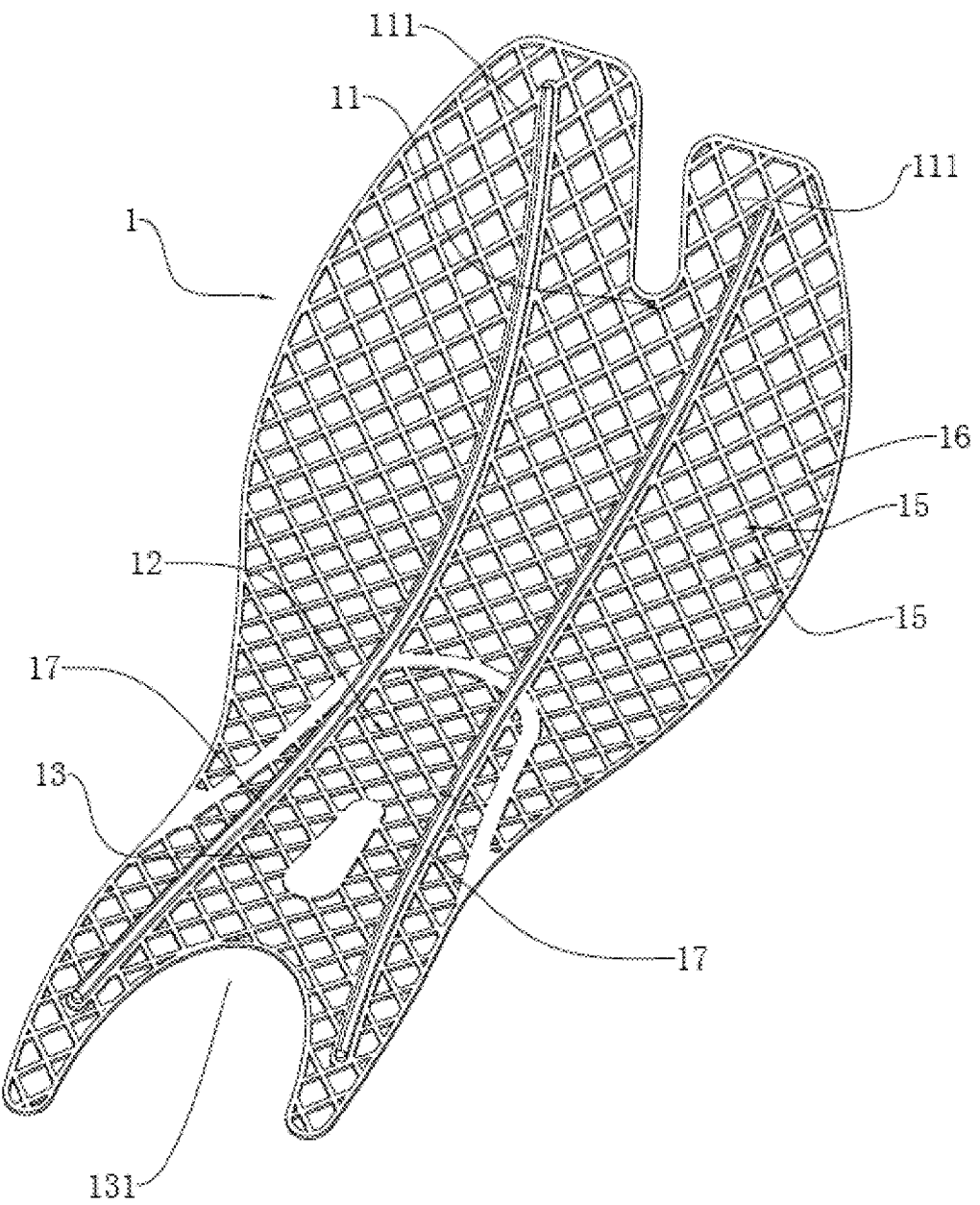
FIG. 1 is a schematic view of a support plate according to Example 1.
Figure 2:
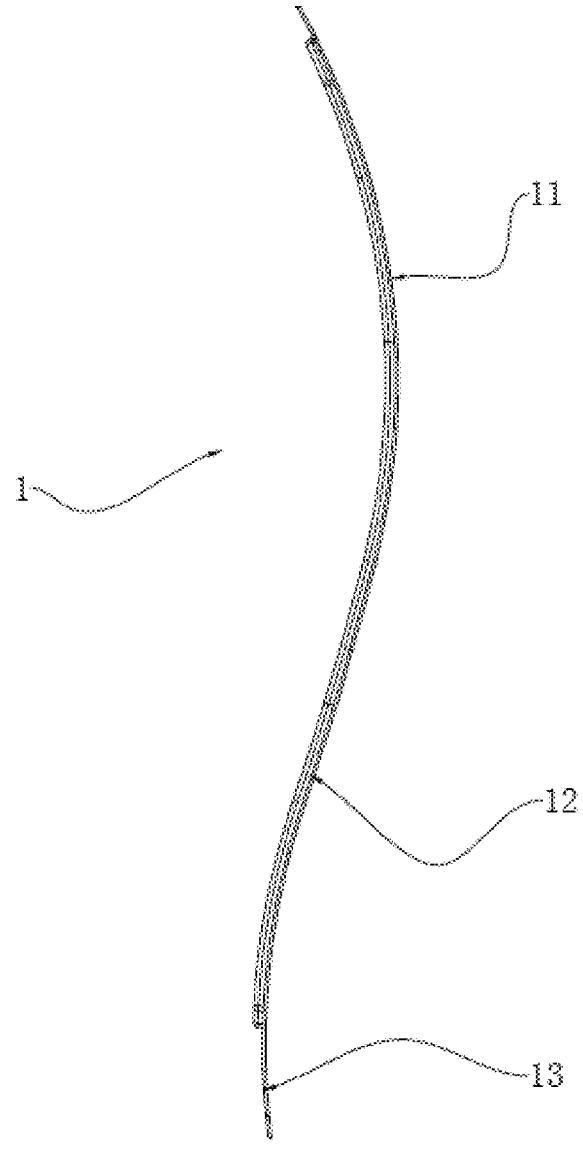
FIG. 2 is a side view of the support plate according to Example 1.

Example 1 discloses a metal support plate structure for footwear, and as shown in FIG. 1 and FIG. 2, the metal support plate structure for the footwear includes a support plate 1, and the support plate 1 in the present example is designed to adapt to a shape of a sole and is a single metal plate. The support plate 1 includes a forefoot portion 11, an arch portion 12, and a heel portion 13 connected in this order. In other examples, the support plate 1 may have only the forefoot portion 11 and the arch portion 12, or the support plate 1 may have only the heel portion 13 and the arch portion 12.

It should be noted that, in other examples, the support plate 1 may be provided as two or more segments, a part of the segments has only the forefoot portion 11 and/or the arch portion 12, and a part of the segments has only the arch portion 12 and/or the heel portion 13.

The forefoot portion 11 is curved in a direction close to a foot of a human body to form a curve section. The configuration of the curve section is better able to overcome the pressure from the foot of the human body, reducing the possibility of the support plate 1 deforming under pressure.

The support plate 1 may be further optimized in the specific shape by providing a notch at a front side edge of the forefoot portion 11, so that the forefoot portion 11 of the support plate 1 is divided into two toe pressure deformation portions 111 by the notch. The two toe pressure deformation portions 111 are pressed by a thumb and other four fingers respectively so as to be deformed under force, thereby being able to adapt to different movement scenes, which is helpful to further improve the wearing comfort of the footwear.

Also, the support plate 1 may be further optimized in the specific shape by providing a heel relief notch 131 at a rear side edge of the heel portion 13, thereby improving the elastic bending capability of the heel portion 13 to reduce pressure-induced discomfort during foot engagement.

The support plate 1 is provided with hollowed mesh holes 15 across a surface thereof for lightening the support plate 1. Each of the hollowed mesh holes 15 may be a circular, square or diamond-shaped hole. In the example, the support plate 1 has a plurality of ribs 16 arranged in a crisscross pattern, with adjacent ribs 16 intersecting at angles ranging from 45° to 70°, specifically 45°, 60° or 70°. These ribs 16 collectively define the hollowed mesh holes 15.

A proportion of the hollowed mesh holes 15 in the support plate 1 ranges from 50% to 90%. To minimize a weight of the support plate 1 and ensure lightweight properties of the sole, the proportion of the hollowed mesh holes 15 may be maximized while maintaining structural integrity to prevent fracture of the support plate 1. Furthermore, the proportion of the hollowed mesh holes 15 may vary across different regions of the support plate 1, which may be adjusted mainly according to load-bearing requirements at different regions of the support plate 1. The proportion of the hollowed mesh holes 15 at a region with a higher load-bearing requirement is correspondingly reduced, and the proportion of the hollowed mesh holes 15 at a region with a lower load-bearing requirement is correspondingly increased. For example, the proportions of the hollowed mesh holes 15 at the forefoot portion 11 and the rear heel portion 13 are greater than that at the arch portion 12.

It should be noted here that, for some soles, the support plate 1 is partially exposed at outer side of the sole after the support plate 1 is formed and embedded within the sole. Consequently, positions of the hollowed mesh holes 15 on the support plate 1 can be designed and adjusted in advance so that the exposed portions of the support plate 1 are not provided with the hollowed mesh holes 15.

An upper and/or lower surface of the support plate 1 is convexly configured with one or more reinforcing ribs 17, at least one of which extends along a longitudinal direction of the support plate 1. The reinforcing ribs 17 may also span across the forefoot portion 11 and the rear heel portion 13 of the support plate 1.

The arrangement of the reinforcing ribs 17 allows for an increased proportion of the hollowed mesh holes 15 while enhancing the structural strength of the support plate 1, effectively reducing a risk of fracture of the support plate 1 caused by long-term stress.

The support plate 1 is manufactured from a lightweight metal material having a density of less than 5 g/cm$^3$, which may be a titanium alloy, an aluminum alloy or a magnesium-lithium alloy, etc. In the present embodiment, the support plate 1 is manufactured from a titanium alloy material.

The support plate 1 manufactured from the titanium alloy material may be obtained by a process such as forging, extrusion or casting. However, considering that the hollow mesh holes 15 and the reinforcing ribs 17 of the support plate 1 are provided in the present embodiment, the support plate 1 is integrally molded by means of 3D printing, which is advantageous to the rapid molding of the support plate 1, i.e. the molding process is simple, thereby improving the stability of the molding quality of the support plate 1.

The implementation principle of Example 1 is as follows: the support plate 1 manufactured from the lightweight metal material with a density of less than 5 g/cm$^3$ has superior strength and rigidity, and in combination with a structure including the hollowed mesh holes 15 and the reinforcing ribs 17, the lightweight degree of the support plate 1 can be further increased, and the strength and rigidity of the support plate 1 can also be improved. In this way, the support plate 1 can also provide support, rebound and acceleration capability after being installed in the interior of the sole instead of the carbon fiber plate, and thus the runner can save more effort during running, and at the same time, the sole can be kept lightness and convenient for the wearer to run and move.

Since the lightweight metal material can be molded by casting, extrusion or 3D printing in one process, the manufacturing process is simpler, i.e. the molding process is simpler, thereby improving the stability of the molding quality of the support plate 1.

Example 2

Figure 3:
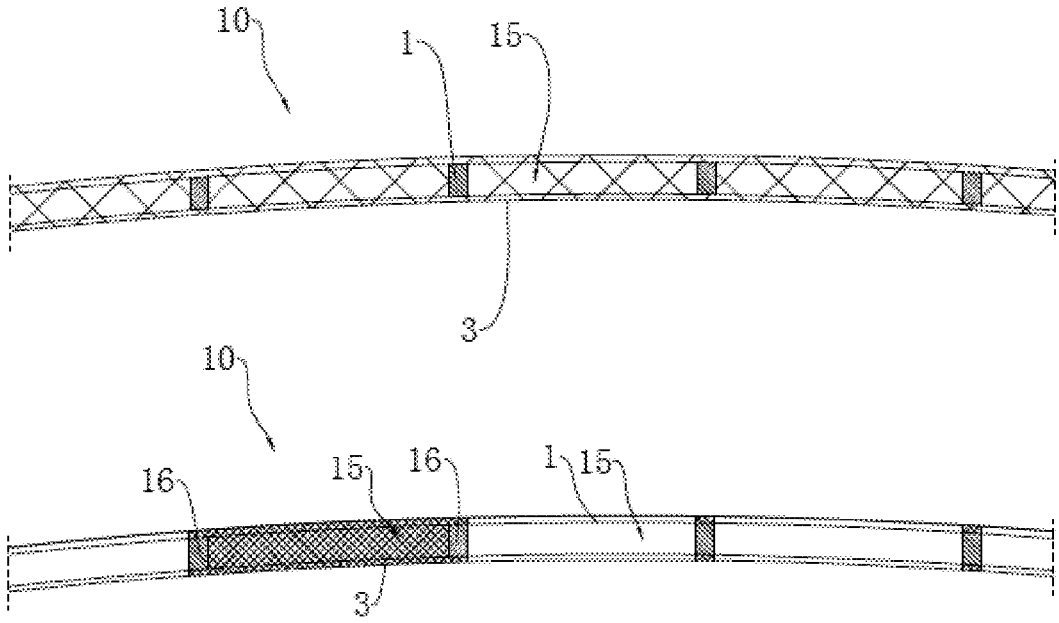
FIG. 3 is a partial cross-sectional view of a composite support plate at two locations according to Example 2.

Embodiment 2, based on Example 1, incorporates the following configurations: as shown in FIG. 3, the surface of the support plate 1 is covered with a TPU film 3. The TPU film 3 may completely cover the support plate 1 and the hollowed mesh holes 15 thereon (see the first schematic view in FIG. 3), or may only cover the surface of the support plate 1 to expose the hollowed mesh holes 15 of the support plate 1 (see the second schematic view in FIG. 3). The TPU film 3 and the support plate 1 are combined to form a composite support plate 10.

The TPU film 3 may be a TPU hot-melt adhesive film, which is adhered to the surface of the support plate 1, and the shape of the TPU hot-melt adhesive film may be adjusted according to different positions and numbers of exposed hollowed mesh holes 15. For example, a hole corresponding to the hollowed mesh holes 15 of the support plate 1 is provided on the TPU hot-melt adhesive film, so as to ensure that the TPU hot-melt adhesive film does not cover the hollowed mesh holes 15 of the support plate 1 after the adhesion.

The TPU film 3 may alternatively be secured to the surface of the support plate 1 by means of an existing injection molding process. In order to improve the molding effect of the TPU film 3, the present embodiment also discloses a process for molding the composite support plate 10, which includes the following steps: after the support plate 1 is placed in a molding mold, the mold is closed as shown in FIGS. 4 to 6, and at this time, there is a molding gap between the support plate 1 and the inner wall of a mold cavity 20 of the molding mold.

TPU material is injected into the mold cavity 20 to fill the molding gap and the hollowed mesh holes 15 and wrap the support plate 1. Upon solidification of the TPU material, the TPU film 3 is formed and then the mold is opened, so that the composite support plate 10 is obtained, as shown in the first schematic view of FIG. 3.

Figure 4:
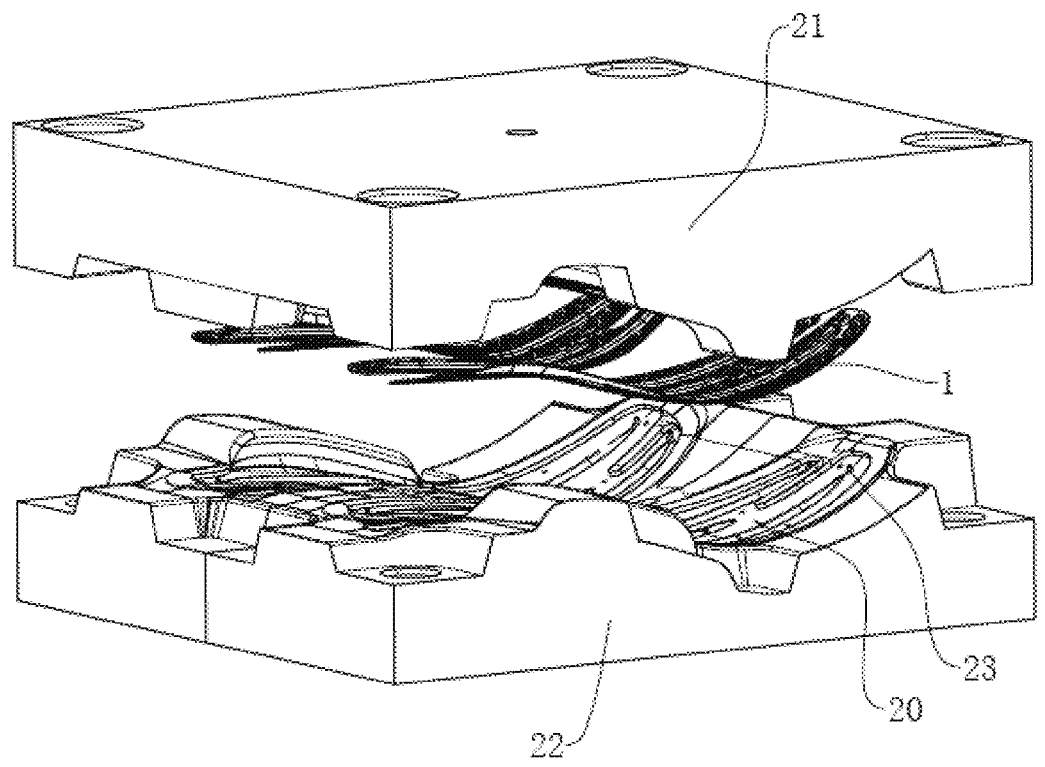
FIG. 4 is a schematic view of a molding mold for the composite support plate according to Example 2.

The present embodiment further discloses a molding mold applied to the molding process of the composite support plate 10, and specifically as shown in FIGS. 4 to 6, the molding mold includes an upper mold 21 and a lower mold 22, and opposing faces of the upper mold 21 and the lower mold 22 cooperate to form the mold cavity 20. The opposing faces of the upper mold 21 and the lower mold 22 each fixedly provided with a plurality of positioning rods 23. The above one of the positioning rods 23 abuts against the upper surface of the support plate 1, and the lower one of the positioning rods 23 abuts against the lower surface of the support plate 1, thereby suspending the support plate 1 in the mold cavity 20 and facilitating the molding of the TPU film 3 wrapped around the support plate 1. It will be understood that the virtual curved surface limited by the abutting end points of the respective positioning rods 23 in the present embodiment is adapted to the curved surface of the support plate 1.

The positioning rods 23 may be arranged uniformly or in point positions. For example, the positioning rods 23 may be arranged at one or more key points in the forefoot portion 11, the arch portion 12, or the heel portion 13 of the support plate 1.

The implementation principle of the example is as follows: the support plate 1 manufactured from the lightweight metal material with a density of less than 5 g/cm$^3$ and having the hollowed mesh holes 15 also has superior strength, rigidity and lightweight effect, and can provide support, rebound and acceleration capability after being installed in the interior of the sole instead of the carbon plate, so that the runner can save much effort during running.

Furthermore, since the lightweight metal support plate 1 can be molded in one process by casting, extrusion or 3D printing, the manufacturing process is simpler, i.e. the molding process is simple, thereby improving the stability of the molding quality of the support plate 1.

In addition, the composite support plate 10 is manufactured by applying the TPU film 3 to the surface of the support plate 1. The TPU film 3 can not only serve as a protective film to reduce the rusting of the support plate 1 and facilitate transportation and individual sale, but also serve as an intermediate connection medium between the support plate 1 and sole material to greatly improve the bonding strength between the composite support plate 10 and the sole material, thereby reducing degumming.

The integral injection molding process exhibits low difficulty and high efficiency.

With regard to the composite support plate 10 with the exposed hollowed mesh holes 15 (where the TPU film 3 does not cover the hollowed mesh holes 15 of the support plate 1), the present embodiment further discloses a molding process and a molding mold corresponding to the composite support plate 10. The upper mold 21 and/or the lower mold 22 are fixed with plugging elements (not shown in figures), which may be configured as block-shaped structures contoured to be adapted to the hollowed mesh holes 15. During mold closure, the plugging elements are inserted into the hollowed mesh holes 15 of the support plate 1, which are able to assist the positioning of the support plate 1 in the mold cavity 20. The number of the blocking pieces may be one or more, and may correspond to the number of the hollowed mesh holes 15.

When injecting the TPU material following the mold closure, due to the plugging elements obstructing the hollowed mesh holes 15 of the support plate 1, the TPU material cannot flow into the hollowed mesh holes 15, exclusively wrapping the surface of the support plate 1 and filling the unobstructed hollowed mesh holes 15.

Upon solidification of the TPU material, the mold is opened and thus the composite support plate 10 is manufactured. At this time, the TPU film 3 of the composite support plate 10 has a hollowed structure.

The hollowed structure of the TPU film 3 enhances adhesive permeability during cold-bond sole attachment, thereby increasing the bonding area and reducing the degumming.

Example 3

Example 3 differs from the molding process of the composite support plate 10 of Example 2 in that, as shown in FIG. 7, the first state diagram in FIG. 7 shows a state before the support plate 1 is placed into the molding mold, and after the support plate 1 is placed into the molding mold, the support plate 1 is positioned in the mold cavity 20 so that the support plate 1 is maintained in a pre-stressed state in the mold cavity 20 in which a front end of the forefoot portion 11 is elastically bent upward by 0 to 5° with respect to a middle portion thereof (see the second state diagram in FIG. 7).

The pre-stressed state may be achieved as follows: the virtual curved surface limited by the abutting end points of the positioning rods 23 in the present embodiment is the curved surface of the forefoot portion 11 of the support plate 1 in an elastically bent state. Therefore, during the mold closure, the mold closing pressure exerted through the abutting of the positioning rods 23 against the curved surface of the support plate 1 thereby causes the front end of the forefoot portion 11 to elastically bend upwards by 0 to 5° with respect to the middle portion thereof.

The pre-stressed state may alternatively be achieved as follows: the positions of the positioning rod 23 relative to the upper mold 21 and the lower mold 22 are adjustable respectively. After the mold closure, the support plate 1 is in a positioning state, and height positions of the respective positioning rods 23 of the forefoot portion 11 are adjusted so that the front end of the forefoot portion 11 elastically bend 0 to 5° upwards relative to the middle portion thereof. That is, the support plate 1 is changed into the pre-stressed state after the mold closure.

After the support plate 1 is in the pre-stressed state, the TPU material is injected into the mold cavity 20 and wrapping the support plate 1. After the TPU film 3 is molded, the composite support plate 10 is obtained, and the mold is opened to release the pre-stressed state of the support plate 1 (see the third state diagram in FIG. 7).

Example 3 is implemented on the principle that: the TPU material is injected into the mold cavity 20 to wrap the support plate 1 in the pre-stressed state of the support plate 1, and the TPU film 3 is molded without tension and compression in the molding mold in the mold closure state. After the molding mold is opened, the upper mold 21 and the lower mold 22 have no clamping force on the composite support plate 10, and the composite support plate 10 recovers the elastic deformation, and the pre-stressed state is released. At this time, the TPU film 3 located on the upper surface of the composite support plate 10 is slightly tensioned, while the TPU film 3 located on the lower surface of the composite support plate 10 is slightly compressed. That is, the TPU film 3 is in the pre-stressed state.

During use of the sole incorporating the composite support plate 10, such as during jumping or running, significant bending occurs in the forefoot region, which will cause a state of the TPU film 3 located on the upper surface of the composite support plate 10 to change from slight tension to compression, and a state of the TPU film 3 located on the lower surface of the composite support plate 10 to change from slight compression to tension. As a result, the TPU film 3 of the composite support plate 10 is less deformed in compression or tension than the composite support plate 10 without the prestressed state, thereby preventing the TPU film 3 from fatigue failure or deformation and tearing damage due to excessive compression or tension deformation.

Furthermore, the TPU film 3 serving as an interfacial bonding medium between the support plate 1 and the sole material exhibits reduced compression or tension deformation magnitude. Therefore, the occurrence of degumming from the sole material due to an excessive degree of deformation and tearing of the TPU film 3 can be reduced, thereby improving the service life of the sole.

Example 4

Example 4 differs from Example 3 in that, as shown in FIG. 8, after the TPU film 3 is molded, a mold is opened and the composite support plate 10 is taken out. At this time, the composite support plate 10 is released from the pre-stressed state due to the loss of the abutment of the positioning rods 23, resulting in elastic recovery of the composite support plate 10. Consequently, the TPU film 3 located on the upper surface of the composite support plate 10 is slightly tensioned, and the TPU film 3 located on the lower surface of the composite support plate 10 is slightly compressed. That is, the TPU film 3 is in the pre-stressed state. At this time, cutting slits 30 are formed on the surface of the TPU film 3 with their longitudinal direction corresponding to that of the ribs 16. A depth of each of the cutting slits 30 is two-thirds of a thickness of the TPU film 3.

The cutting slits 30 may be formed by slitting the surface of the TPU film 3 using an art knife. Alternatively, the surface of the TPU film 3 may be automatically slit by a mechanical arm, or may be disposable slit by a cutting mold.

The implementation principle of the example is as follows: the slitting is performed along the longitudinal directions of the ribs 16 when the TPU film 3 of the composite support plate 10 is in the pre-stressed state, the pre-stress of the TPU film 3 located on the upper surface of the composite support plate 10 may be eliminated partially, thereby significantly enhancing the easy-to-compress characteristic of the TPU film 3 located on the upper surface of the composite support plate 10. Meanwhile, the slight-compression degree of the TPU film 3 on the lower surface of the composite support plate 10 is increased, so that the easy-to-tension characteristic of the TPU film 3 located on the upper surface of the composite support plate 10 is significantly enhanced. As a result, the TPU film 3 of the composite support plate 10 is less deformed in compression or tension than the TPU film 3 of the composite support plate 10 without the pre-stressed state, thereby reducing the occurrence of fatigue failure or deformation tear damage of the TPU film 3 caused by an excessive compression or tension deformation of the TPU film 3.

Furthermore, by providing the cutting slits 30, the glue easily penetrates into the cutting slits 30 during the cold-bond sole attachment process, thereby increasing the bonding area and bonding strength between the composite support plate 10 and the sole material, and thus reducing the degumming.

In addition, since each of the cutting slits 30 has a certain depth, the glue penetrates into the cutting slits 30 and then solidifies, a portion of the TPU film 3 is bonded and solidified at opposite inner walls of each of the cutting slits 30. The bonded and solidified position forms a three-dimensional cartilage frame, which can increase the structural strength of the TPU film 3, so that the deformation of the TPU film 3 is slight. Thus, the occurrence of fatigue failure or deformation tear damage of the TPU film 3 caused by an excessive compression or tension deformation degree of the TPU film 3 is reduced.

Example 5

Example 5 discloses a sole with a support plate 1 or a composite support plate 10 according to any one of Examples 1 to 4, which includes a metal support plate for footwear and a sole body, wherein the support plate 1 or the composite support plate 10 is located between a midsole 51 of the sole body and an outsole 52 of the sole body or above the midsole 51 of the sole body. As shown in FIG. 9, the support plate 1 or the composite support plate 10 in the present embodiment is positioned between the midsole 51 and the outsole 52.

Example 6

Example 6 discloses a process for manufacturing the sole according to Example 5, including the following steps: the support plate 1 or the composite support plate 10 according to any one of the Examples 1 to 4 is secured in the sole by an adhesive coating method so that the support plate 1 is positioned between the midsole 51 and the outsole 52 or above the midsole 51 to manufacture the sole.

Example 7

Example 7 discloses a process for manufacturing the sole according to Example 5, including the following steps: the support plate 1 or the composite support plate 10 according to any one of the Examples 1 to 4 is placed into an injection mold, and a sole feed liquid is injected into the injection mold, and the sole feed liquid is bonded in contact with the support plate 1 or the composite support plate 10 to mold a sole.

During placement of the support plate 1 or the composite support plate 10 into the injection mold, a functional bottom sheet such as a rubber sheet may concurrently be placed within the mold, which is combined with the sole feed liquid as a portion of the sole to provide the sole with functionality.

The injection mold may be a conventional injection mold for soles.

Example 8

Example 8 discloses an injection mold matching the manufacturing process for the sole of Example 7, as shown in FIGS. 10 to 12, including a lower mold holder 31 and an upper mold holder 32 covering the lower mold holder 31. The lower mold holder 31 and the upper mold holder 32 are locked through bolts, the inner cavity of the lower mold holder 31 and the upper mold holder 32 forms the molding cavity, and the lower mold holder 31 or the upper mold holder 32 has a first injection hole (not shown in the figures).

A mounting bracket 33 is fixedly connected to a lower end face of the lower mold holder 31. The mounting bracket 33 is vertically slidably connected to lifting plates 311 located below the lower mold holder 31, and the lifting plates 311 may be provided in plurality. The mounting bracket 33 is provided with a lifting driving member for driving sliding movement of the lifting plates 311 In the present embodiment, the lifting driving member may be a rodless cylinder 312 having a cylinder body fixedly connected to the mounting bracket 33 and a lifting end fixedly connected to the lifting plate 311. Each of the lifting plates 311 is provided with a positioning column 34 that slides through a bottom wall of the lower mold holder 31. In the present embodiment, a lower end of the positioning column 34 is fixedly connected to an upper end face of the lifting plate 311, and the bottom wall of the lower mold holder 31 is provided with a through hole 313 through which the positioning column 34 passes.

The positioning column 34 has a mounting cavity, and the positioning column 34 is provided with a fixing injection tube 341 which is internally placed in the mounting cavity. An upper portion of the fixing injection tube 341 fixedly penetrates through the upper end face of the positioning column 34, and an upper end nozzle of the fixing injection tube 341 is a second injection hole. A lower end face of the support plate 1 is provided with a positioning blind hole 35, and an upper end of the fixing injection tube 341 is inserted into the positioning blind hole 35. An outer wall of the positioning column 34 is convexly provided with a cutting blade 342. In the present embodiment, the cutting blade 342 may be slidably connected to the positioning column 34 in a radial direction. Specifically, an outer peripheral wall of the positioning column 34 is radially opened with blade grooves 343 connected to the mounting cavity. The blade grooves 343 may be provided in plurality and distributed around the axis of the positioning column 34. The cutting blade 342 is slidably connected to the blade grooves 343 in the radial direction.

The positioning column 34 is provided with an adjustment mechanism 36 for adjusting a sliding position of the cutting blade 342. The adjustment mechanism 36 includes a movable injection tube 361 disposed in the mounting cavity and axially slidably connected to the positioning column 34, a hinge rod 362 hinged at one end to the cutting blade 342 and at the other end to an outer wall of the movable injection tube 361, and an injection tube drive assembly 363 for driving the sliding of the movable injection tube 361. An upper portion of the movable injection tube 361 is slidably sleeved on a lower portion of the fixing injection tube 341, a lower portion of the movable injection tube 361 slidably penetrates through the lifting plate 311, and a lower end of the movable injection tube 361 is externally connected to the injection equipment (not shown in the figure). In the present embodiment, a lower outer wall of the positioning column 34 is axially opened with a sliding groove 344 connected to the mounting cavity and located below the lower mold holder 31, and the sliding groove 344 is located above the lifting plate 311. The injection tube drive assembly 363 includes a first slide plate 3631 fixedly connected to the outer wall of the movable injection tube 361 and slidably penetrating through the sliding groove 344, and an injection tube cylinder 3632 having a cylinder body fixedly connected to the upper end face of the lifting plate 311. The injection tube cylinder 3632 has a piston rod fixedly connected to the lower end face of the first slide plate 3631.

A bracket 37 is fixedly connected to the upper end face of the upper mold holder 32, and provided with a limiting rod 371 which slidably penetrates through a top wall of the upper mold holder 32. An upper portion of the limiting rod 371 has a threaded section threaded through the bracket 37. A lower portion of the limiting rod 371 is a polished rod penetrating through the top wall of the upper mold holder 32. A lower end of the limiting rod 371 abuts against the upper end face of the support plate 1, and an upper end of the limiting rod 371 is fixedly connected to a rotating rod 372.

A molding method of manufacturing a sole with the injection mold of the present embodiment includes the following steps:

In step S1, the prepared support plate 1 is cleaned; the rodless cylinder 312 drives the lifting plate 311 to move upwards so that the positioning column 34 slides through the bottom wall of the lower mold holder 31 and extends into the molding cavity; the extension of the piston rod of the injection tube cylinder 3632 drives the movable injection tube 361 to move upwards relative to the positioning column 34, so that the cutting blade 342 is pushed by the hinge rod 362 to slide and extend out of the blade grooves 343, and thus the cutting edge of the cutting blade 342 protrudes from the outer peripheral wall of the positioning column 34, and the inner walls of the lower mold holder 31 and the upper mold holder 32 are coated with a release agent.

In step S2, the positioning blind hole 35 of the support plate 1 is aligned with the fixing injection tube 341, so that the upper end of the fixing injection tube 341 is inserted into the positioning blind hole 35 to support the support plate 1.

In step S3, the upper mold holder 32 is closed, the lower mold holder 31 and the upper mold holder 32 are locked through the bolts, the rotating rod 372 is rotated to drive the limiting rod 371 to rotate, and the limiting rod 371 moves downwards under restriction effect of the thread, so that the lower end of the limiting rod 371 abuts against the upper end face of the support plate 1.

In step S4, the sole feed liquid is injected into the molding cavity through the first injection hole, after the sole is formed and solidified, the rodless cylinder 312 drives the lifting plate 311 to move downwards to drive the positioning column 34 to descend, and in the process of the positioning column 34 moving downwards, the cutting blade 342 performs scratch processing on the inner peripheral wall of the positioning hole formed in the positioning column 34 so as to improve the roughness of the inner peripheral wall of the positioning hole, and pours a molding filler into the positioning hole formed in the positioning column 34 through the second injection hole so as to block the positioning hole, and when the positioning column 34 is about to come out of the sole, contraction of the piston rod of the injection tube cylinder 3632 moves the movable injection tube 361 downward with respect to the positioning column 34, pulls the cutting blade 342 via the hinge rod 362 to be received in the blade grooves 343, prevents the lower end of the scratch from extending out of the lower end face of the sole, and facilitates the contraction of the positioning column 34 in the through hole 313. In the present embodiment, the sole feed liquid may be low density polyethylene (having a melting point of 110° C. to 120° C.), and the molding filler may be a low-melting polyolefin elastomer (having a melting point of 50° C. to 70° C.).

In step S5, demolding.

Example 9

Example 9 discloses a shoe including an upper 6 and a sole according to Example 5.

Example 10

Example 10 discloses a metal support plate structure for footwear, which is applied to the upper 6 to improve the functionality of the upper 6. As shown in FIGS. 13 and 14, the metal support plate structure for the footwear includes support plates 1, which may be one or two. For example, a single support plate 1 may be provided at the toe of the upper 6 or at the heel of the upper 6, or two support plates 1 may be provided at the toe of the upper 6 and at the heel of the upper 6, respectively.

In the present embodiment, two support plates 1 are provided, and the support plates 1 are formed in semi-enclosed shapes so as to adapt to the shape of the toe of the upper 6 and the shape of the heel of the upper 6, respectively. An upper edge of the support plate 1 at the toe extends to a toe surface of the upper 6, and an end of the support plate 1 near an inner side of the toe is shorter than an end of the support plate 1 near an outer side of the toe, so as to fit the foot.

The support plate 1 at the heel extends to both sides of the upper 6 at the heel. Specifically, the support plate 1 includes a first portion 62 in the middle and a second portion 63 provided on both sides of the first portion 62. The first portion 62 has a height at the upper edge higher than that of the second portion 63 at the upper edge. The height of the first portion 62 at the upper edge gradually decreases from the middle towards two ends, the two ends of the first portion 62 transition toward the second portions 63 at an inclined angle, which is greater than the angle at which the height of the first portion 62 itself gradually decreases and is relatively steep. However, the height of the second portion 63 at the upper edge gradually decreases in the direction away from the first portion 62, and the end face of the second portion 63 is inclined toward the first portion 62.

The lower edge of the support plate 1 may also be provided with a plurality of deformation notches 64 at intervals along its own extension direction.

The hollowed mesh holes 15 are provided on the surface of the support plate 1 for realizing a lightweight design of the support plate 1. Each of the hollowed mesh holes 15 may be a circular hole or a square hole or a rhombic hole, or may be shaped as a regular polygon, and is specifically provided according to requirements. In the present embodiment, the hollowed mesh holes 15 may be configured as regular hexagon arranged in a honeycomb pattern.

Each of the hollowed mesh holes 15 may be a through hole or a blind hole.

A hole diameter of each of the hollowed mesh holes 15 may be correspondingly reduced according to stress conditions encountered during use. The hollowed mesh holes 15 occupy 50% to 90% of the area of the support plate 1. The design of the hollowed mesh holes 15 may be increased as much as possible to reduce the weight of the support plate 1 under the condition of ensuring that the support plate 1 does not break.

In order to further improve the strength of the support plate 1, reinforcing ribs 17 may be provided on the surface of the support plate 1. The reinforcing ribs 17 may be integrally molded with the support plate 1. The reinforcing ribs 17 may be provided on the outer surface and/or the inner surface of the support plate 1, and the number of the reinforcing ribs 17 may be one or more.

The reinforcing ribs 17 may further be provided in the hollowed mesh holes 15. A plurality of reinforcing ribs 17 may be provided in a single hollowed mesh hole 15, and the number of the reinforcing ribs 17 may be configured according to requirements. The plurality of reinforcing ribs 17 are arranged in intersecting longitudinal and transverse orientations. It should be noted that the reinforcing ribs 17 may be aligned parallel to the edges of the hollowed mesh holes 15, or may be inclined. When the number of the reinforcing ribs 17 in the hollowed mesh holes 15 is relatively small, the reinforcing ribs 17 provided in two adjacent hollowed mesh holes 15 may alternatively be arranged in a staggered manner in the lengthwise direction.

The support plate 1 is manufactured from the lightweight metal material with a density of less than 5 g/cm³ such as a titanium alloy, an aluminum alloy or a magnesium-lithium alloy. Specifically, in the present embodiment, the support plate 1 is manufactured from a titanium alloy material.

The support plate 1 manufactured from the titanium alloy material may be obtained by a process such as forging, extrusion or casting. However, considering the configuration of the hollowed mesh holes 15 and the arrangement of the reinforcing ribs 17 of the support plate 1 in the present embodiment, the support plate 1 is integrally molded by means of 3D printing, which is advantageous to the rapid molding of the support plate 1, i.e. the molding process is simple, thereby improving the stability of the molding quality of the support plate 1.

Furthermore, a protective layer may be provided on the outer surface of the support plate 1, and the protective layer may be a TPU film 3 having a thickness set according to requirements, so as to increase water resistance, anti-corrosion oxidation, etc. of the support plate 1 and improve the service life thereof. In order to prevent the support plate 1 from hitting an external hard object and thereby injuring the foot, the inner surface of the support plate 1 is provided with an elastic layer, which may be an elastic foam.

The present embodiment also discloses a shoe, as shown in FIG. 15, including a sole and an upper 6, wherein the above-mentioned support plate 1 is provided at the toe and heel of the upper 6, and the support plate 1 may be provided in an interlayer of the upper 6, may optionally be provided on the outside of the upper 6, and may also be provided on the inside of the upper 6. Specifically, the support plate 1 may be provided as required. In the present embodiment, the support plate 1 is provided on the outside of the upper 6.

The above are preferred examples of the present application, and the protection scope of the present application is not limited thereto, and thus equivalent changes in structure, shape and principle of the present application shall be covered by the protection scope of the present application.

DESCRIPTION OF REFERENCE NUMERALS

1. support plate;
3. TPU film;
6. upper;
11. forefoot portion;
111. toe pressure deformation portion;
10. composite support plate;
12. arch portion;
13. heel portion;
131. heel relief notch;
15. hollowed mesh hole;
16. rib;
17. reinforcing rib;
20. mold cavity;
21. upper mold;
22. lower mold;
23. positioning rod;
30. cutting slit;
31. lower mold holder;
311. lifting plate;
312. rodless cylinder;
313. through hole;
32. upper mold holder;
33. mounting bracket;
34. positioning column;
341. fixing injection tube;
342. cutting blade;
343. blade groove;
344. sliding groove;
35. positioning blind hole;
36. adjustment mechanism;
361. movable injection tube;
362. hinge rod;
363. injection tube drive assembly;
3631. first slide plate;
3632. injection tube cylinder;
37. bracket;
371. limiting rod;
372. rotating rod;
51. midsole;
52. outsole;
62. first section;
63. second section;
64. deformation notch.

What is claimed is:

1. A metal support plate for footwear, comprising a support plate, wherein the support plate is manufactured from a metal material with a density of less than 5 g/cm³, the support plate is provided with hollowed mesh holes occupying 50% to 90% of a total area of the support plate, the metal support plate is configured with a notch at a front side of a forefoot portion of the metal support plate, so that the forefoot portion is divided into two toe pressure deformation portions by the notch, a surface of the metal support plate is convexly configured with reinforcing ribs, and at least one of the reinforcing ribs extends along a longitudinal direction of the metal support plate.

2. The metal support plate for footwear according to claim 1, wherein the metal support plate is integrally molded by a three-dimensional (3D) printing process.

3. The metal support plate for footwear according to claim 1, wherein the surface of the metal support plate is covered with a thermoplastic polyurethane (TPU) film.

4. A sole, comprising a sole body and the metal support plate for footwear according to claim 1.

5. The sole according to claim 4, wherein the metal support plate is located between a midsole of the sole body and an outsole of the sole body or above the midsole of the sole body.

6. A shoe, comprising the sole according to claim 4 and an upper.

7. The shoe according to claim 6, wherein the metal support plate is located between a midsole of the sole body and an outsole of the sole body or above the midsole of the sole body.

8. The shoe according to claim 6, wherein the metal support plate is disposed at at least one of a toe of the upper or at a heel of the upper.

\*   \*   \*   \*   \*